US008992089B2

United States Patent
Raby et al.

(10) Patent No.: US 8,992,089 B2
(45) Date of Patent: Mar. 31, 2015

(54) LAYSHAFT END BEARING RETROFIT WITH EXTERNAL POSITIVE OIL PRESSURE DELIVERY

(71) Applicant: IMS Solution, Watkinsville, GA (US)

(72) Inventors: Jacob Dean Raby, Cleveland, GA (US); Charles Lauren Navarro, Momence, IL (US)

(73) Assignee: IMS Solutions, Watkinsville, GA (US)

( * ) Notice: Subject to any disclaimer, the term of this patent is extended or adjusted under 35 U.S.C. 154(b) by 77 days.

(21) Appl. No.: 13/826,941

(22) Filed: Mar. 14, 2013

(65) Prior Publication Data

US 2014/0037235 A1  Feb. 6, 2014

Related U.S. Application Data

(60) Provisional application No. 61/677,511, filed on Jul. 31, 2012.

(51) Int. Cl.
| | | |
|---|---|---|
| F16C 33/10 | (2006.01) | |
| F16C 17/08 | (2006.01) | |
| B23P 15/00 | (2006.01) | |

(52) U.S. Cl.
CPC ............... *F16C 17/08* (2013.01); *B23P 15/003* (2013.01); *F16C 2360/22* (2013.01); *F16C 33/1045* (2013.01)
USPC ........................................................ 384/462

(58) Field of Classification Search
USPC .................. 384/462, 471, 473, 322, 371, 397; 123/196 R, 195 C; 184/6.5
See application file for complete search history.

(56) References Cited

U.S. PATENT DOCUMENTS

| | | | |
|---|---|---|---|
| 3,558,942 A * | 1/1971 | Hill et al. .......................... | 310/54 |
| 3,636,795 A | 1/1972 | Maurice et al. | |
| 4,429,924 A * | 2/1984 | Franz et al. .................... | 384/462 |
| 4,512,298 A | 4/1985 | Hayashi | |
| 4,729,349 A | 3/1988 | Sonoda | |
| 4,777,842 A | 10/1988 | Yamada | |
| 4,805,565 A | 2/1989 | Sato et al. | |
| 4,840,149 A | 6/1989 | Fujita | |
| 4,957,079 A | 9/1990 | Nakatani et al. | |
| 5,066,146 A * | 11/1991 | McDonner ..................... | 384/473 |
| 5,567,306 A * | 10/1996 | DeWachter .................... | 384/473 |
| 5,702,321 A | 12/1997 | Bakowski et al. | |
| 5,755,194 A | 5/1998 | Moorman et al. | |
| 5,979,392 A | 11/1999 | Moorman et al. | |
| 5,988,129 A | 11/1999 | Prior et al. | |
| 6,032,635 A | 3/2000 | Moorman et al. | |
| 6,308,621 B1 * | 10/2001 | Douillard et al. ............. | 384/462 |
| 6,640,933 B2 * | 11/2003 | Henry et al. ................... | 184/5.1 |
| 7,004,131 B1 | 2/2006 | Plenzler et al. | |

(Continued)

*Primary Examiner* — Thomas R. Hannon
(74) *Attorney, Agent, or Firm* — Mitch Harris, Atty at Law, LLC; Andrew M. Harris

(57) ABSTRACT

A bearing for retro-fit or repair of an engine provides high reliability through a sleeved bearing design having externally-supplied lubrication. The bearing assembly may be supplied as a kit including a lubrication delivery tube and an oil filter adapter having a port for supplying the external lubrication to a mounting flange of the bearing. In order to install the bearing a captive sleeve is inserted in a hollow end of the shaft being supported. A cap having a threaded stud is inserted with the sleeve into the hollow end of the shaft and secured by the required snap ring. Then a nut is used to secure the cap and the sleeve to a stud affixed to the mounting flange that secures the bearing assembly to the engine.

17 Claims, 6 Drawing Sheets

(56) References Cited

U.S. PATENT DOCUMENTS

| | | |
|---|---|---|
| 7,533,739 B2 | 5/2009 | Cooley et al. |
| 7,552,782 B1 | 6/2009 | Sexton et al. |
| 7,559,695 B2 | 7/2009 | Sexton et al. |
| 7,604,073 B2 | 10/2009 | Cooley et al. |
| 7,694,773 B2 | 4/2010 | Janson et al. |
| 7,845,436 B2 | 12/2010 | Cooley et al. |
| 7,861,805 B2 | 1/2011 | Dick et al. |
| 7,870,913 B1 | 1/2011 | Sexton et al. |
| 7,896,551 B2 | 3/2011 | Cooley et al. |
| 7,942,218 B2 | 5/2011 | Cooley et al. |
| 7,987,931 B2 | 8/2011 | Cooley et al. |
| 8,028,770 B2 | 10/2011 | Dick et al. |
| 8,061,452 B2 | 11/2011 | Cooley et al. |
| 8,069,933 B2 | 12/2011 | Sexton et al. |
| 8,210,285 B2 | 7/2012 | Cooley et al. |
| 8,210,747 B2 | 7/2012 | Cooley et al. |
| 8,220,999 B2 | 7/2012 | Cooley et al. |
| 2001/0015182 A1 | 8/2001 | Moorman et al. |
| 2003/0223664 A1 | 12/2003 | Harui |
| 2007/0177835 A1* | 8/2007 | Verhaegen .................. 384/462 |
| 2007/0277751 A1* | 12/2007 | Lin et al. .................. 123/196 R |
| 2010/0218995 A1 | 9/2010 | Sexton et al. |
| 2010/0288558 A1 | 11/2010 | Sexton |
| 2011/0088955 A1 | 4/2011 | Cooley et al. |
| 2011/0174544 A1 | 7/2011 | Scott et al. |
| 2011/0289936 A1 | 12/2011 | Suciu et al. |
| 2012/0024107 A1 | 2/2012 | Sowul et al. |
| 2012/0037425 A1 | 2/2012 | Sexton et al. |
| 2012/0039551 A1 | 2/2012 | Cooley et al. |
| 2012/0048622 A1 | 3/2012 | Cooley et al. |
| 2012/0057814 A1 | 3/2012 | Dadson et al. |

* cited by examiner

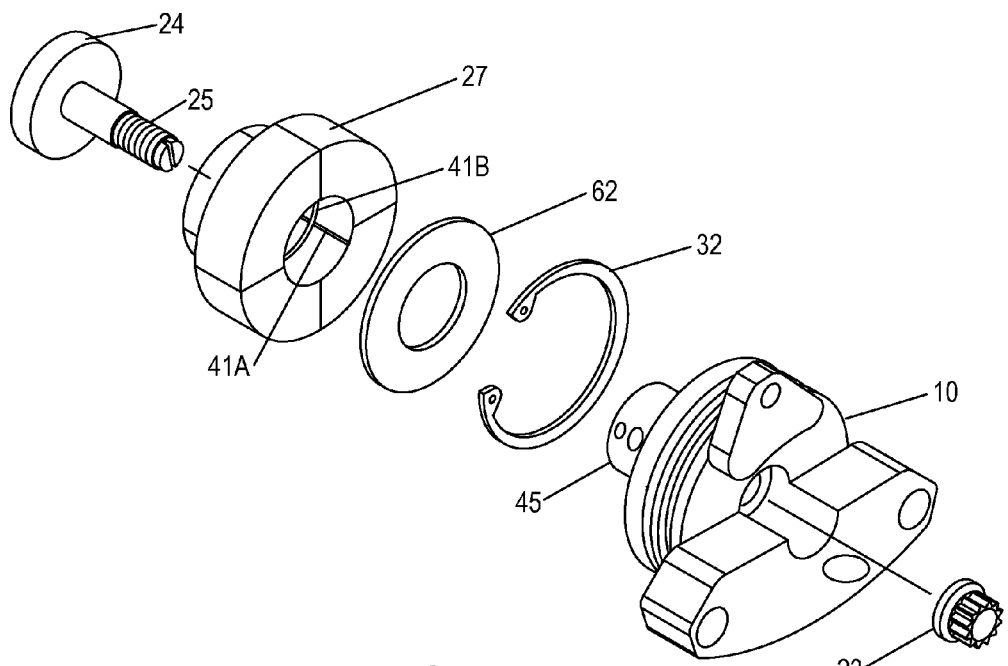
FIG. 5A
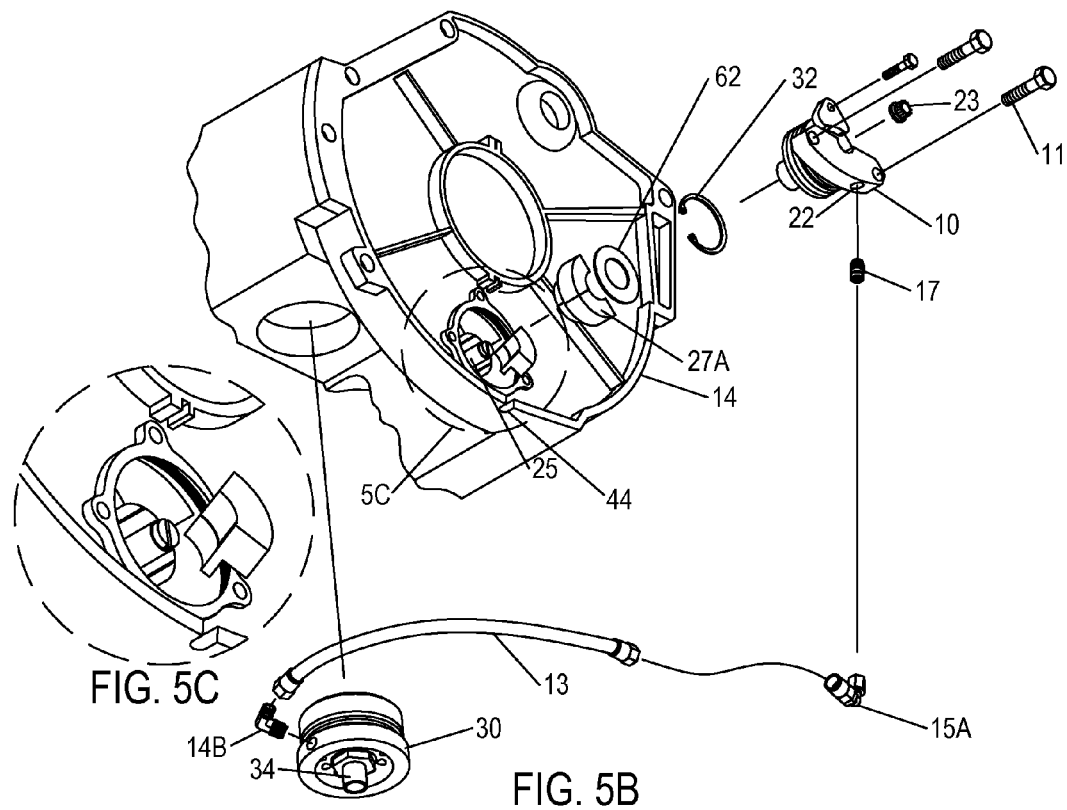
FIG. 5C
FIG. 5B

US 8,992,089 B2

LAYSHAFT END BEARING RETROFIT WITH EXTERNAL POSITIVE OIL PRESSURE DELIVERY

This U.S. Patent Application claims priority under 35 U.S.C. §119 to U.S. Provisional Patent Application Ser. No. 61/677,511 filed on Jul. 31, 2012.

BACKGROUND OF THE INVENTION

1. Field of the Invention

The present invention relates generally to end bearings for machines, and more specifically, to a high-reliability bearing retrofit for supporting rotation of an internal combustion engine layshaft, also referred to as an intermediate shaft.

2. Description of the Related Art

Some horizontally-opposed engines are subject to bearing failure due to the use of a ball-bearing that supports the end of an intermediate layshaft used to couple the valve camshafts to the drive shaft. In one mode of failure, the ball bearing assembly fills with oil, causing failure of the lubrication retaining seals and the internal lubrication itself, releasing the balls from the ball bearings into the engine, causing catastrophic failure of the engine. Other modes of failure may also be present in such bearings.

Updates that have been implemented replace the original ball bearing with other ball-bearing types, but have limited lifetimes due to poor lubrication availability at the end of the intermediate layshaft, inherent issues with the bearings and bearing materials, and/or various operating conditions of the engine itself that tend to increase bearing wear both in idle and at high speeds.

Therefore, it would be desirable to provide an improved method and apparatus providing increased reliability and load carrying capability for rotating shaft end support bearings. It would be further desirable to provide an easily installed kit that can facilitate retrofit of engines subject to layshaft end-bearing failures with or without the engine being disassembled for the installation.

SUMMARY OF THE INVENTION

The objective of providing increased reliability bearing end support and increased load carrying capability is provided in a bearing having externally-supplied lubrication and its method of operation. A retrofit kit and installation method for retrofitting and/or repairing and engine by installing the bearing and lubrication system provides an effective upgrade or repair path for mechanics and engine builders.

One independent feature of the bearing includes installation of a captive bushing that is inserted in a hollow end of the shaft being supported. A cap having a threaded stud is inserted with the sleeve into the hollow end of the shaft and then a nut is used to secure the cap and sleeve to a stud affixed to a flange that secures the bearing assembly to the engine.

Another independent feature of the bearing is a lubrication delivery system that provides lubrication to the sleeve through the flange. Pressurized oil is delivered to the bearing through a tube from another high-pressure oil source of the engine. A port in the flange may receive an external source of lubrication, which may be provided through a tube connected to another port on an external surface of the engine. The other port may be a port of an oil filter adapter that is inserted between an oil filter and an oil filter fitting of the engine, or another port or oil line that is available outside of or internal to the engine cover.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIG. 5A is an exploded isometric view of a bearing assembly in accordance with another embodiment of the invention and FIG. 5B is an exploded isometric view of an engine bearing retrofit installation of the bearing assembly illustrated in FIG. 5A. FIG. 5C is an expanded view of callout 5C in FIG. 5B.

DESCRIPTION OF ILLUSTRATIVE EMBODIMENT

The present invention includes bearing assemblies that may be used in retrofitting and/or repairing engines subject to layshaft end-bearing failures, but having techniques that may also be used in new machine designs. In order to avoid the above-described failure mode of a ball-bearing assembly, the present invention incorporates a sleeve-type plain bearing that can be installed without disassembling the engine. A cap is provided with a post that extends through the bushing, and the stud on which the bushing rotates, so that the cap and bushing can be installed in the end of the intermediate shaft. The cap and bushing are captured within the intermediate shaft behind a snap ring, and then the stud, which is part of the bearing assembly mounting flange, is inserted within the sleeve as the mounting flange is installed and secured to the engine. Lubrication is provided through channels in the stud and mounting flange to the cap and bushing. The lubrication is provided to a port on an external surface of the mounting flange from a source of pressurized oil elsewhere in the engine, which may be from an oil filter adapter that taps lubrication from the oil filter attachment point.

Figure 1A:
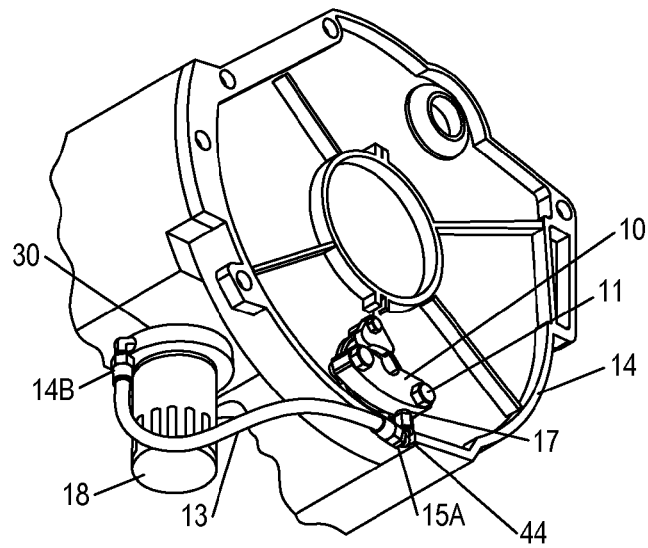
FIG. 1A is an isometric view and FIG. 1B is an exploded isometric view of an engine bearing retrofit installation in accordance with an embodiment of the invention.
Figure 1B:
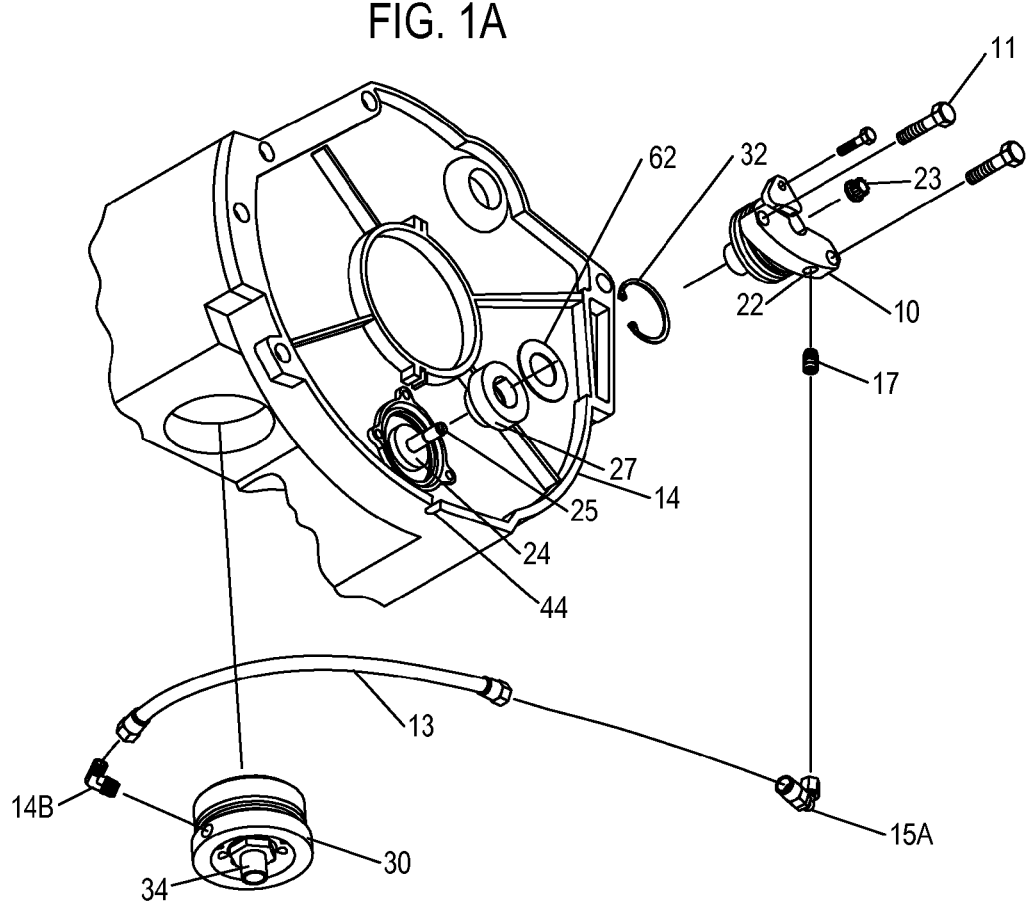

Referring to FIGS. 1A-1B, which are isometric views of an engine block having horizontally-opposed pistons, in which a retrofit or repair kit is installed or being installed, respectively, in accordance with an embodiment of the invention. A bearing assembly is installed to support the end of a layshaft, sometimes referred to as an intermediate shaft, at which a stock ball-bearing type roller bearing was previously installed, and is being replaced with a plain (journal) type bearing assembly in accordance with the present invention. However, techniques according to the present invention may be applied in other circumstances and designs in which it is desirable to replace a roller bearing with a lubricated plain bearing, or other modifications requiring application of some or all of the techniques disclosed herein. The layshaft has a hollow sleeve end into which a bushing 27 of the bearing assembly is inserted and locked in place with a snap ring 32 that fits in a groove provided in the sleeve end of the layshaft. A cap 25 that has a threaded post portion 24 is first inserted in the sleeve end of the layshaft with the bushing 27 slid over cap 25, then both the bushing 27 and cap 25 are locked in place with snap ring 32. A plug may first be inserted in the sleeve end of the layshaft to prevent oil from entering the hollow portion of the layshaft beyond the plug and increasing the inertia of the layshaft. Then, after bushing 27 and cap 25 are locked in place, cap 25 is secured against bushing by tightening a nut 23 onto a portion of threaded post portion 24 that protrudes through a flange portion 10 of the bearing assembly once flange portion 10 is installed by inserting a stud portion 45 through bushing 27. Stud portion 45 and flange portion 10 are generally formed as one piece from the same material, but alternatively may be assembled from separate pieces and of different materials. A shim 62 is provided between bushing 27 and snap ring 32 to reduce wear, to allow for proper lubrication, and to further allow for adjustment of longitudinal play of the layshaft when the bearing assembly is installed. Three bolts 11 secure the flange portion 10 of the bearing assembly to the engine cover 14. In order to provide high reliability, bushing 27 is fabricated from a high strength wear-resistance aluminum alloy to reduce wear and flange portion 10 is fabricated from a steel alloy. While the design of the bearing is such that very high reliability is expected, the particular design also provides a fail-safe failure mode, in that stud portion 45

Figure 2A:
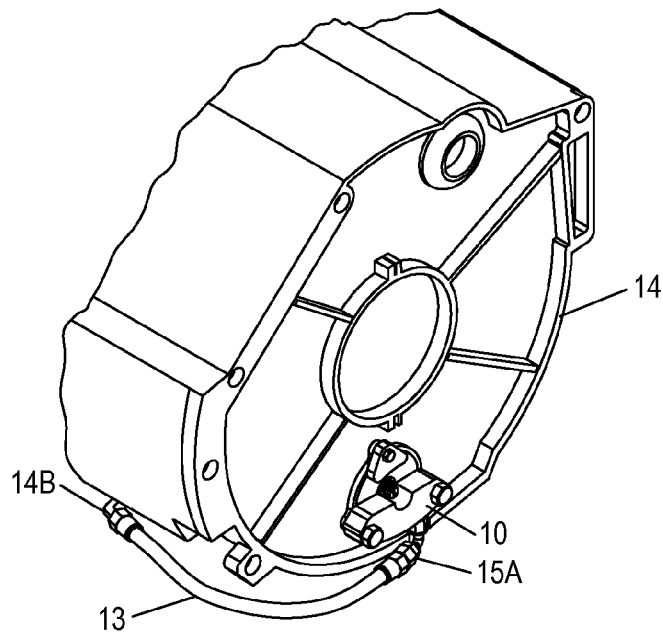
FIG. 2A is an isometric view and FIG. 2B is an exploded isometric view of the engine bearing retrofit installation of FIGS. 1A and 1B, shown from another angle.
Figure 2B:
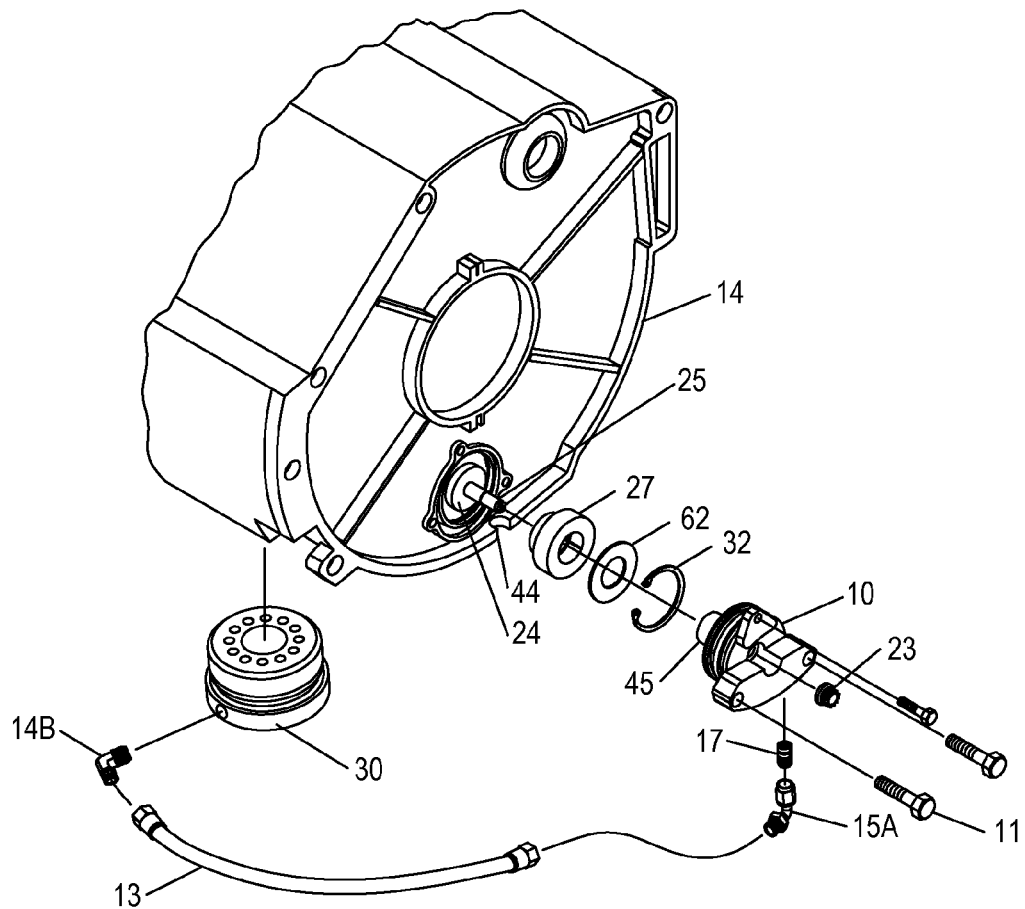

In order to lubricate the bearing assembly, since sufficient lubrication is not present within the region of the engine block in the vicinity of (and within) the end of the layshaft, a oil delivery tube 13 couples oil, with optional filtration, from another portion of the engine block at a high oil pressure point within the oil circulation system to a port 22 on the exterior of flange portion 10. Oil is conducted from port 22 through channels interior to flange portion 10 and to outlet holes on surfaces of stud portion 45. In the exemplary embodiment, an adapter 30 is included between oil filter 18 and the oil filter mounting location on engine cover 14. Adapter 30 has a port to which oil delivery tube 13 is coupled with an elbow 14B to receive high pressure oil and a threaded post-type oil filter mount 34. The other end of oil delivery tube 13 is coupled to a port on the flange portion 10 of the bearing assembly with a threaded pipe nipple 17 and an elbow 15A. A kit for retrofitting the engine block includes adapter 30, oil delivery tube 13 and the bearing assembly, and may optionally include an oil filter 18 of an improved performance for ensuring that oil delivered to the bearing assembly through port 22 is highly filtered to prevent any particulate from damaging bearing. An optional check-valve or oil accumulator may be included in-line with oil delivery tube 13 to maintain pressure at bearing assembly 10 when the engine is shut down, in order to provide lubrication at the moment of initial startup. The only modification required to install the kit on a typical engine is removal of a small segment 44 of the flywheel shroud of engine cover 14 near the bell house, in order to provide a path for routing oil delivery tube 13. The retrofit bearing kit shown in FIGS. 1A-1B has the advantage of high reliability over stock ball bearings, and over roller-type bearings in general, and further has a soft failure mode. The retrofit bearing kit is considered to have a soft failure mode since if the bearing assembly seizes, there are no balls, rollers or cages released into engine cover 14 and the bearing assembly will cause the layshaft to stop turning, thereby stopping rotation of the camshafts that control the valves which halts the engine, or if the bearing assembly breaks, the portion of the bearing assembly within the sleeve end of the layshaft can continue to rotate. The exemplary embodiment of the present invention has only three wear surfaces versus 11 wear surfaces and 8 rotating parts in the stock ball-bearing design. Referring now to FIGS. 2A-2B, the engine block of FIGS. 1A-1B is shown from another angle for clarity. Since there are no additional details or components in FIGS. 2A-2B, the description with reference to FIGS. 1A-1B applies equally to FIGS. 2A-2B.

Figure 3:
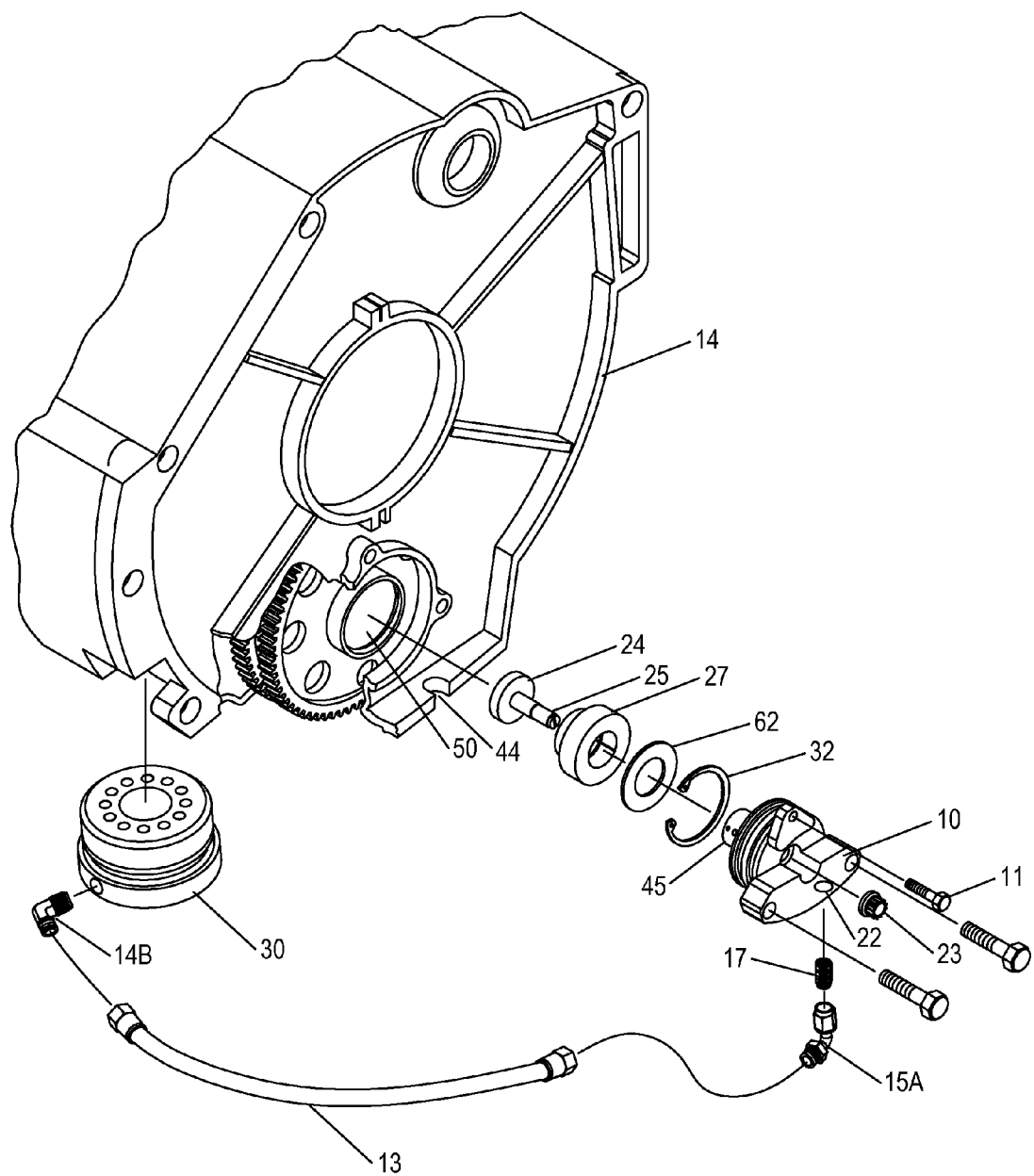
FIG. 3 is an exploded isometric view of the engine bearing retrofit installation of FIGS. 1A-1B and FIG. 2A-2B, showing further details.

Referring now to FIG. 3, further details of the engine block of FIGS. 1A-1B and FIGS. 2A-2B are shown. In FIG. 3, a cut-away of engine cover 14 is provided to show the sleeve end of layshaft 50 into which the cap 25, bushing 27 and shim 62 are installed and secured with snap ring 32. Flange portion 10 includes a cylindrical portion that seals the hole in engine cover 14 when installed and includes gasketing around the periphery where the cylindrical section of flange portion 10 contacts engine cover 14.

Bushing 27 of the bearing assembly provides a bearing surface that contacts the inner surface of cap 25, as well as the cylindrical inner bearing surface of bushing 27, which rides on a hydrodynamic film of oil between bushing 27 and the bearing portion 45 of flange portion 10. The end of bushing 27 opposite cap 25 also contacts a bearing surface provided on the inner face of flange portion 10 so that both end bearing surfaces provide longitudinal and radial support to bushing 27, and thus provide support against any longitudinal forces or radial forces caused by movement of or axial tension/compression of the layshaft. It is important that the proper amount of axial play be provided between flange portion 10 of bearing assembly, which is secured to engine cover 14, and bushing 27, which is secured within the sleeve end of the layshaft. The axial play between bushing 27 and flange portion 10 of bearing assembly controls axial movement of the layshaft, too much of which can lead to knocking and excessive timing chain/sprocket wear, and too little of which will cause some portion of the assembly to seize. Therefore shim 62 is provided to help control the movement of layshaft, in addition to reducing wear and providing for effective lubrication of the bearing.

Figure 4A:
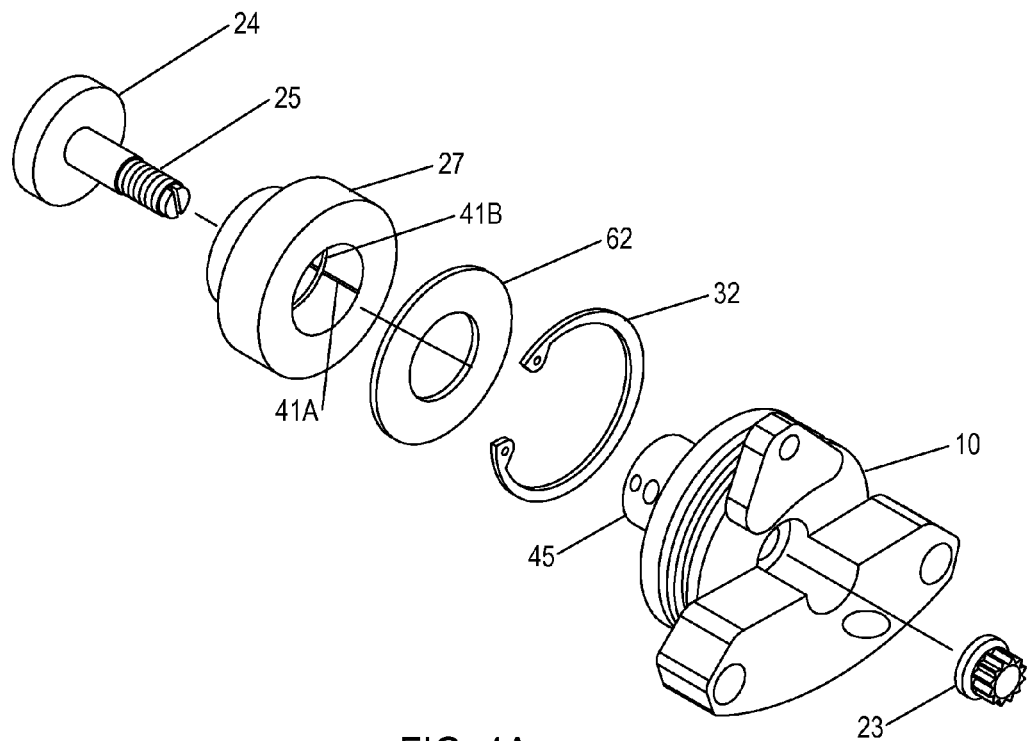
FIGS. 4A-4B are exploded isometric views of a bearing assembly of the retrofit bearing assembly included in FIG. 3, showing further details.
Figure 4B:
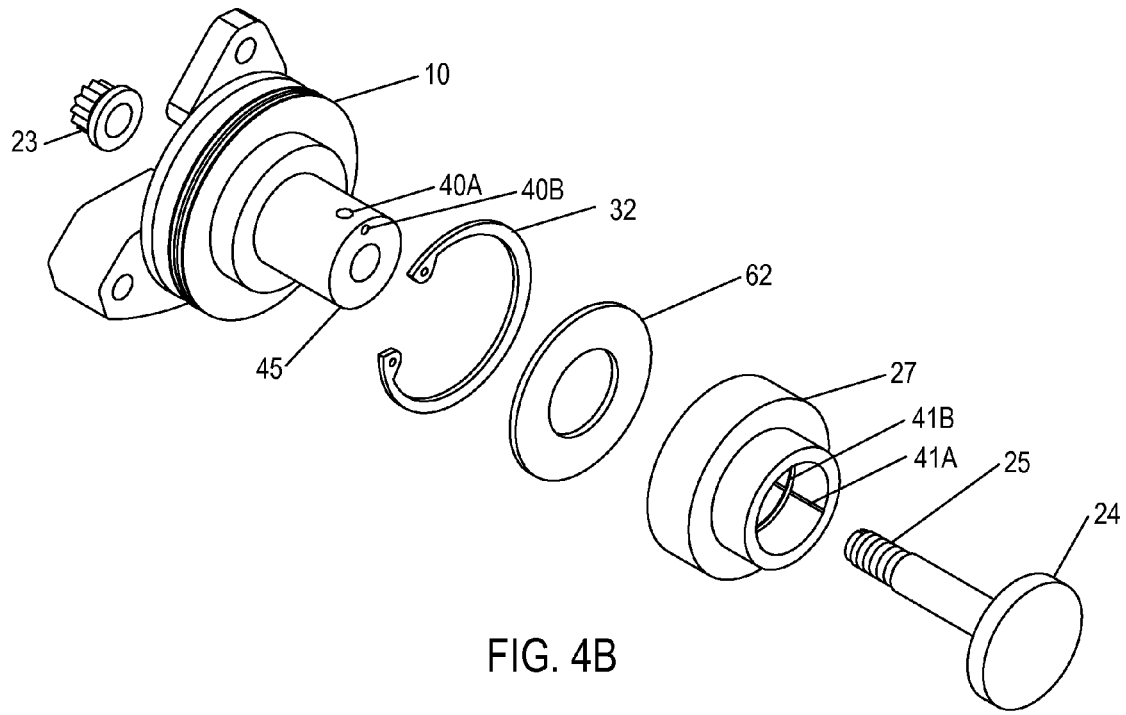

Referring now to FIGS. 4A-4B, further details of the bearing retrofit kit of FIGS. 1A-1B, FIGS. 2A-2B and FIG. 3 are shown. In FIGS. 4A-4B, which are isometric views from opposite ends of the bearing assembly, lubrication details, such as channels 41A and 41B are shown on the inside surface of bushing 27, which provide for conducting high pressure oil from a port 40A on the outer bearing face of bearing portion 45. Further, another port 40B provides lubrication between the inside face of cap 25 and the end of bushing 27.

Referring now to FIGS. 5A-5B, an alternative bearing retrofit kit is illustrated that is suitable for installation in an engine having different mechanical features from the engine described above. In the depicted engine, the hole in engine cover 14 has a smaller diameter than the inside diameter of the sleeve end of the layshaft. In order to install the bushing, a split bushing formed from bushings 27A is provided, that can be individually inserted in the end of the layshaft as illustrated in FIG. 5B. Since the layshaft can be moved while the bearing assembly is not installed, sufficient clearance is available to install the bushings 27A individually until all are installed. The remainder of the assembly is the same as for the engine as illustrated above in FIGS. 1-4B.

Figure 6A:
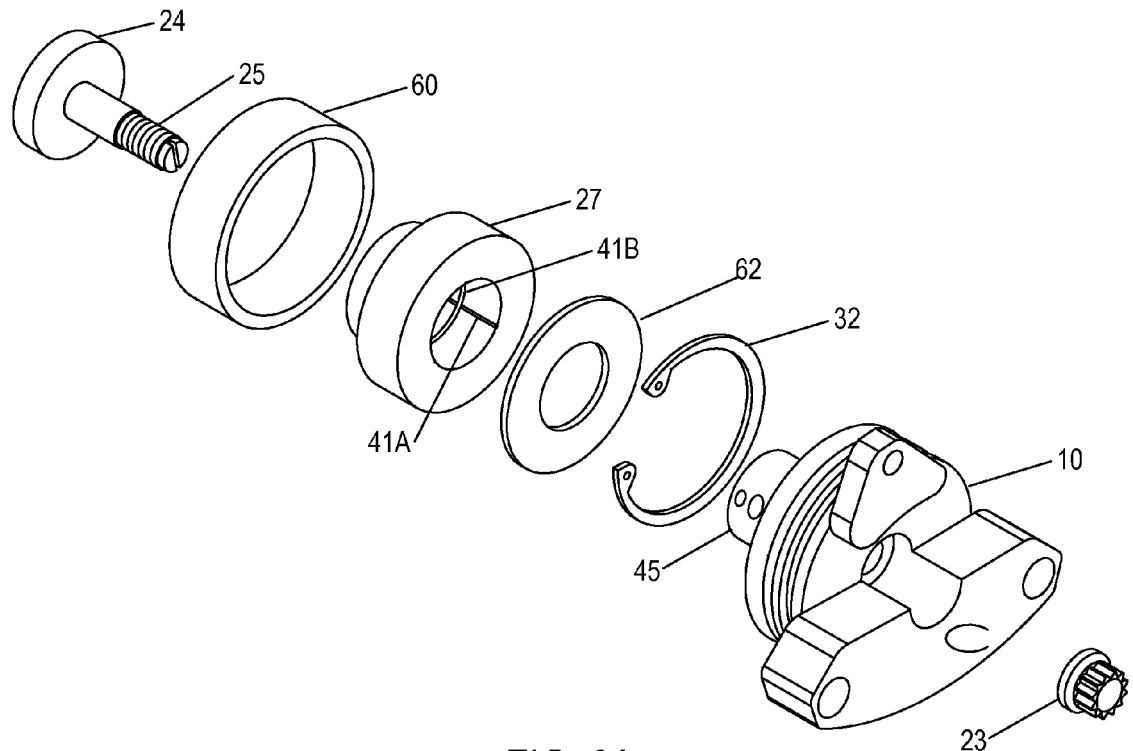
FIG. 6A is a exploded isometric view of a bearing assembly in accordance with yet another embodiment of the invention and FIG. 6B is an exploded isometric view of an engine bearing retrofit installation of the bearing assembly illustrated in FIG. 6A.
Figure 6B:
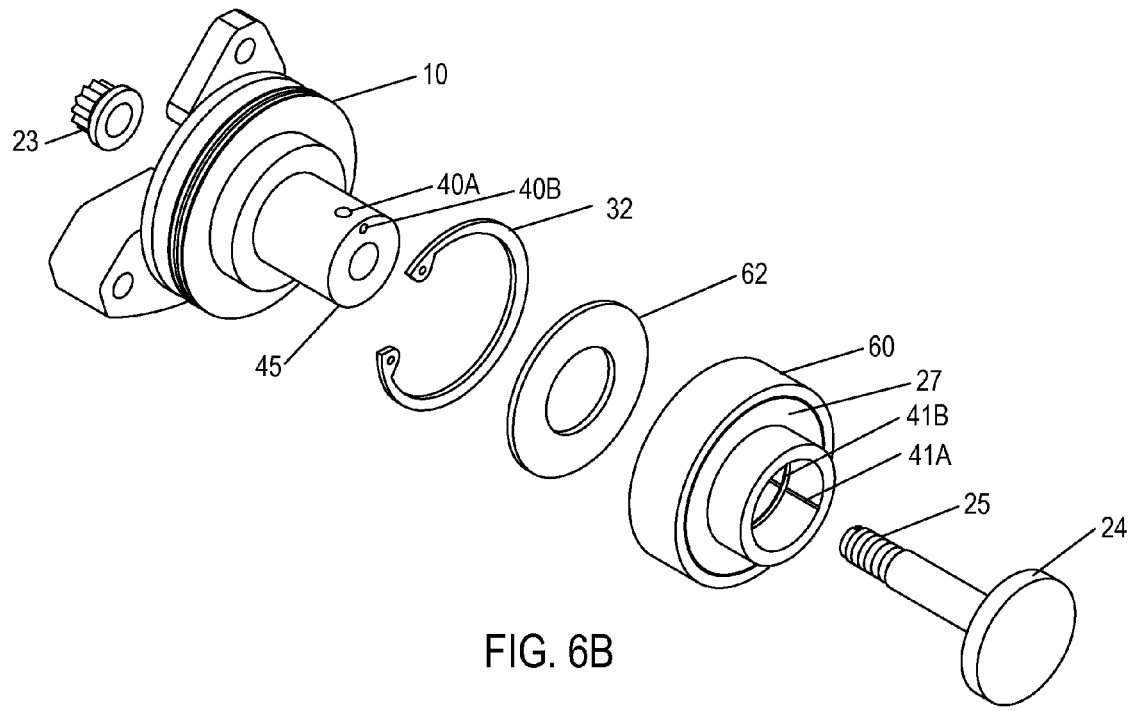

Referring now to FIGS. 6A-6B, another alternative bearing retrofit kit is illustrated that is suitable for installation in the engine described above with reference to FIGS. 5A-5B. In order to install the bushing of the alternate embodiment of FIGS. 6A-6B, engine cover 14 must be removed so that an assembly formed from bushing 27 and a press-fit adapter 60, that is attached to bushing 27, can be installed in the end of the layshaft, along with cap 25 and shim 62. Providing adapter 60 allows the same kit components to be used for retrofit kits applicable to any of the engines described herein, with the addition of adapter 60 being the only difference required for installation in the engine described with reference to FIGS. 5A-6B.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. An end bearing assembly for mounting to an external surface of an engine and supporting an end of a rotary shaft of the engine, the end bearing assembly comprising:
    a rotating bearing for coupling to an end of the rotary shaft, wherein the rotating bearing comprises a bushing for coupling to an end of the rotary shaft and a stud for insertion into the bushing and on which the bushing rotates;
    a flange mechanically secured to the bearing for mounting the end bearing assembly to the external surface of the engine; and
    an oil delivery system comprising a tube coupled to a first port on the flange for delivering pressurized oil to surfaces of the rotating bearing from a source of pressurized oil of the engine, wherein the oil delivery system supplies lubrication to the bushing and the stud through an oil channel extending from the first port through the flange.

2. The end bearing assembly of claim 1, wherein the oil channel extends through the flange and the stud to one or more holes on an external surface of the stud between the bushing and the stud.

3. The end bearing assembly of claim 2, wherein a first end of the tube is connected to the first port on the flange and a second end of the tube connects to a second port on an adapter for coupling to a first oil filter fitting of the engine and which further includes a second oil filter fitting for attaching an oil filter, whereby the adapter supplies the first port with the lubrication from oil supplied to the oil filter fitting from the engine while providing for filtering a remainder of the oil by the oil filter attached to the second oil filter fitting.

4. The end bearing assembly of claim 2, further comprising:
    a cap for securing the bushing to the stud, wherein the cap includes a cap portion and a post portion, wherein the post portion extends through a central void within the stud and through a hole in the flange, wherein the post portion is at least partially threaded at a distal end opposite the cap portion; and
    a nut threaded onto the distal end of the post portion of the cap at an outside surface of the flange, whereby the cap and the bushing are secured to the stud after installation of the flange.

5. The end bearing assembly of claim 4, wherein an oil channel within the flange is coupled to an oil channel extending through the stud to a hole at an end of the stud opposite the flange to provide lubrication between an inside surface of the cap portion and an end of the sleeve opposite the flange.

6. The end bearing assembly of claim 5, wherein the oil channel within the stud is coupled to another hole on a cylindrical face of the stud to provide the lubrication between the cylindrical face of the stud and an inside surface of the bushing.

7. The end bearing assembly of claim 1, wherein the engine is a horizontally-opposed engine, and wherein the rotating bearing is adapted for supporting an intermediate layshaft of the engine.

8. An end bearing assembly for supporting an end of a rotary shaft, comprising:
    a bushing for captive insertion within the end of the rotary shaft;
    a stud for insertion into the bushing and on which the bushing rotates; and
    a flange mechanically secured to the stud for mounting the end bearing assembly to an external surface of an engine.

9. The end bearing assembly of claim 8, further comprising a cap for securing the bushing to the stud, wherein the cap includes a cap portion and a post portion, wherein the post portion extends through a central void within the stud.

10. The end bearing assembly of claim 9, wherein the post portion extends through a hole in the flange, wherein the post portion is at least partially threaded at a distal end opposite the cap portion, and wherein the end bearing assembly further comprises a nut threaded onto the distal end of the post portion of cap at an outside surface of the flange, whereby the cap and bushing are secured to the stud after installation of the flange.

11. The end bearing assembly of claim 10, further comprising a snap ring for securing the cap and a sleeve within the end of the rotary shaft, whereby the post portion of the cap and the nut provide for securing the cap and the bushing to the stud and the flange after the snap ring is installed within the end of the rotary shaft to capture the cap and the sleeve.

12. The end bearing assembly of claim 8, wherein the bushing is fabricated from an aluminum alloy.

13. The end bearing assembly of claim 8, wherein the engine is a horizontally-opposed engine, and wherein the rotating bearing is adapted for supporting an intermediate layshaft of the engine.

14. A method of supporting an end of a rotary shaft of an engine, comprising:
    coupling an end of the rotary shaft to a bushing of a bearing;
    inserting a stud of the bearing into the bushing, wherein the stud is mechanically connected to a flange and wherein the bushing rotates on the stud;
    securing the flange to an outer surface of the engine; and
    supplying lubrication to the bushing and the stud of the bearing through a tube extending from a source of pressurized oil of the engine through a first port on the flange that is coupled to a channel extending through the flange.

15. The method of claim 14, wherein the channel extends through the flange and the stud to one or more holes on an external surface of the stud between the bushing and the stud.

16. The method of claim 14, wherein the tube couples the first port on an external surface of the flange to the source, wherein a first end of the tube is connected to the first port on the flange and a second end of the tube connects to a second port on an adapter for coupling to a first oil filter fitting of the engine and which further includes a second oil filter fitting for attaching an oil filter, whereby the adapter supplies the first port with the lubrication from oil supplied to the oil filter fitting from the engine while providing for filtering a remainder of the oil by the oil filter attached to the second oil filter fitting.

17. The method of claim 14, wherein the supporting supports an end of an intermediate layshaft of a horizontally-opposed engine.

* * * * *